July 9, 1929.  E. R. DOUGHERTY  1,719,927

BAND SAW GUIDE

Filed Oct. 1, 1928

Inventor
Eugene R. Dougherty
By William Seler
Attorney

Patented July 9, 1929.

1,719,927

UNITED STATES PATENT OFFICE.

EUGENE R. DOUGHERTY, OF CANTON, OHIO, ASSIGNOR TO CENTRAL ALLOY STEEL CORPORATION, OF MASSILLON, OHIO, A CORPORATION OF NEW YORK.

BAND-SAW GUIDE.

Application filed October 1, 1928. Serial No. 309,463.

This invention relates to a novel guide which is particularly adapted for use on band saws and the like.

An object of the invention is to provide a novel band saw guide of rugged compact construction and consisting of a minimum number of easily assembled parts.

Another object of the invention is to provide a guide which will effectively serve to guide a band saw along a predetermined line of travel, and which will reduce band saw breakage to a minimum.

These and other objects of the invention will become more readily apparent in the course of the following description of the invention, taken in connection with the accompanying drawings, wherein Fig. 1 is a front elevation of the novel band saw guide in operative position on a band saw;

Figures 1, 2:
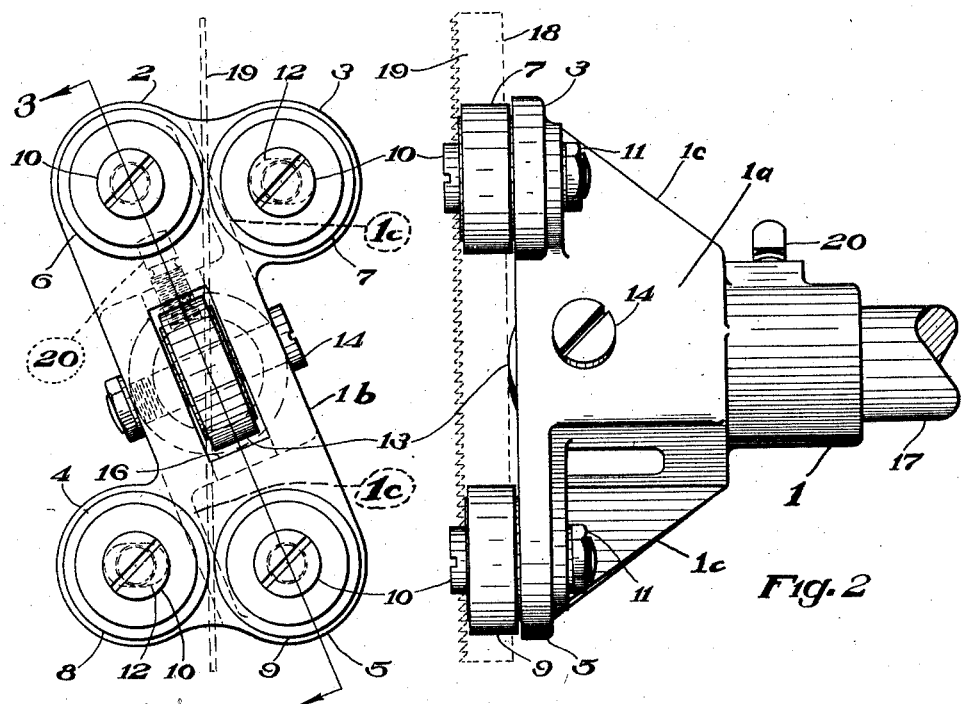
Fig. 2 is a side elevation of the guide.

Referring more particularly to the drawings, it will be seen that the guide includes a supporting head or body, comprising a rear bored hub 1 for mounting upon a supporting shaft 17, a recessed rectangular extension 1ª from said hub, and an elongated front plate or flange 1ᵇ reinforced by tangential webs 1ᶜ extending from opposite sides of the rectangular recessed extension 1ª. The ends 2, 5 of the plate 1ᵇ serve as mountings for guide rollers 6 and 9, and have projecting laterally in opposite directions ears 3 and 4 which serve as mountings for guide rollers 7 and 8.

Figure 3:
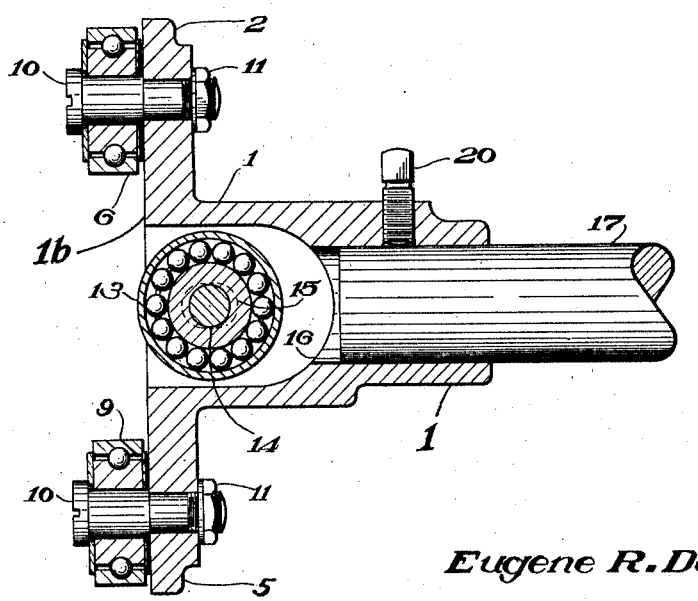
Fig. 3 is a cross-section through the guide, taken on the line 3—3 of Fig. 1.

Ball-bearing wheels or rollers, 6, 7, 8 and 9 are rotatably mounted on shouldered cap screws 10, which, in turn, are rigidly secured to the ends 2 and 5, and the ears 3 and 4 of the supporting head, by means of nuts 11. The rollers 7 and 8 are capable of being adjusted laterally to a small degree, elongated holes 12 being provided in the ears 3 and 4 for this purpose. A fifth ball-bearing roller 13 is rotatably mounted on a cap screw 14, bearing in elongated holes 15 in the head 1 of the guide, these holes permitting a slight adjustment of the roller longitudinally of the guide. The axis of the roller 13 is at right angles to the axis of the other rollers, and the roller lies in a plane which passes through the axes of rollers 6 and 9. This roller normally projects out of a cavity or hollow 16 in the head of the guide, as clearly shown in Figs. 2 and 3.

The guide is slipped on a shaft 17, which is suitably mounted a short distance above the work table of the band saw, and its position is adjusted until the peripheral face of the roller 13 is in contact with the rear edge 18 of the band saw 19, and the rollers 6, 7, 8 and 9 are in contact with the sides of the band saw, as shown in Fig. 1. The guide is then secured in adjusted position on the shaft by means of a set screw 20.

The rollers 6, 7, 8 and 9 effectively maintain the band saw in vertical position, and their ball bearing construction reduces the friction between the peripheral faces of the rollers and the sides of the band saw to a minimum, thereby virtually eliminating this source of frequent band saw breakage. In band saw guides of the type shown in the patent to McChesney, No. 425,105, the friction of the saw against the rigid guide member C, is such as to cause rapid hardening or crystallization of the steel in the band saw, with consequent breakage of the saw on encountering the slightest obstruction.

The rear roller 13 cooperates with the other rollers to maintain the band saw in vertical position, and its ball-bearing construction likewise reduces friction between the peripheral face of the roller and the rear edge 18 of the band saw. The angular position of the roller 13, with respect to the band saw, moreover permits the peripheral face of the roller to be worn uniformly instead of being grooved centrally from constant usage, as would be the case when employing a roller in a vertical position, as shown for example in the patent to Kaudela, No. 836,446.

While I have illustrated a preferred form of the invention, it will be readily understood that various changes may be made in the size, form, and arrangement of the various parts of the guide, without departing from the scope of the invention, as defined in the appended claim.

I claim:

A band saw guide comprising a supporting head having a mounting hub, a recessed extension, and an elongated front plate reinforced by webs tangential to the said extension, a back roller mounted in the recessed extension and side guide rollers mounted on the ends of said front plate in line with the back roller, ears projecting from diagonally opposite side edges of the front plate, and opposed side guide rollers for the saw mounted on said ears, so that the saw is guided between the side rollers diagonally across the periphery of the back roller.

In testimony whereof I affix my signature.

EUGENE R. DOUGHERTY.